US 6,726,999 B2

(12) United States Patent
Schueler et al.

(10) Patent No.: US 6,726,999 B2
(45) Date of Patent: Apr. 27, 2004

(54) FREE FLOWING POLYESTER MOLDING COMPOSITION

(75) Inventors: Ralf Schueler, Recklinghausen (DE); Heinz Peirick, Coesfeld (DE); Harald Haeger, Recklinghausen (DE); Ralf Richter, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 132 days.

(21) Appl. No.: 10/024,385

(22) Filed: Dec. 21, 2001

(65) Prior Publication Data

US 2002/0120076 A1 Aug. 29, 2002

(30) Foreign Application Priority Data

Dec. 21, 2000 (DE) .......................................... 100 64 335

(51) Int. Cl.$^7$ ................................................. B32B 27/06
(52) U.S. Cl. ................. 428/474.9; 428/475.2; 428/475.5; 524/538; 525/425
(58) Field of Search ........................... 428/474.9, 475.2, 428/475.5; 524/538; 525/425

(56) References Cited

U.S. PATENT DOCUMENTS 3,442,975 A * 5/1969 Cawthon et al.
5,762,849 A 6/1998 Argast et al. ............ 264/176.1
6,355,358 B1 3/2002 Boer et al. ................ 428/474.4
2002/0037972 A1 3/2002 Maul et al.

FOREIGN PATENT DOCUMENTS

| DE | 19 15 772 | 10/1969 |
|---|---|---|
| DE | A-19 15 772 | 10/1969 |
| DE | A-30 31 491 | 4/1982 |
| EP | 1 065 048 | 1/2001 |
| EP | 1 120 443 | 8/2001 |
| GB | 12 10 790 | 10/1970 |
| JP | A-55 012 103 | 1/1980 |
| JP | A-03 095 256 | 4/1991 |
| JP | A-11 049 939 | 2/1999 |

* cited by examiner

Primary Examiner—Ana L. Woodward
(74) Attorney, Agent, or Firm—Oblon, Spivak, McClelland, Maier & Neustadt, P.C.

(57) ABSTRACT

A molding composition comprises from 80 to 99.9 parts by weight of thermoplastic polyester and from 0.1 to 20 parts by weight of a polyamide-polyamine graft copolymer, where the sum of the parts by weight of the polyester and of the graft copolymer is 100. The molding composition has improved flowability.

42 Claims, No Drawings

FREE FLOWING POLYESTER MOLDING COMPOSITION

BACKGROUND OF THE INVENTION

1. Field of the Invention

The invention relates to a free-flowing polyester molding composition, in particular for injection molding, and also to a molding produced from this polyester molding composition.

2. Discussion of the Background

In electrical engineering and the electronics industry, the trend is toward ever smaller components. This means that the requirements for flowability of plastics are constantly increasing.

A simple way of improving the flowability of plastics is to reduce the molecular weight. However, there are certain limits here, since any excessively drastic reduction in the molecular weight also has an adverse effect on the mechanical properties of the plastics.

Instead of reducing the molecular weight, there is also the possibility of improving the flow performance of plastics by using flow promoters, such as stearates or montanic esters. For example, JP-A-04 275 327 and DE-A-30 31 491 describe an improvement in the flowability of polyesters on adding pentaerythritol tetrastearate. However, low-molecular-weight esters of this type can bleed out during processing or during use of the resultant molding. In addition, purely aliphatic ester groups of this type are susceptible to hydrolysis, and the degradation products can bleed out and/or damage the polyester matrix. These problems also occur when using trialkyl phosphates, as described in JP-A-55 012 103.

JP-A-11 049 939 and JP-A-03 095 256 propose mixing a polyester with polyalkenyl glycol benzoates to improve flowability. However, on mixing the melts transesterification reactions occur here—as in the abovementioned cases in which other esters are added. In this case the product is a block copolyetherester, i.e. a polymer which is a thermoplastic elastomer with a quite different property profile.

DE-A-19 15 772 discloses a mixture suitable for producing filaments, yarns and bands of improved dye-ability, and the like, and comprising from 5 to 80% by weight of a polyimine-polyamide graft copolymer and from 95 to 20% by weight of a polyester. However, these mixtures are not used for producing moldings. Nor is it apparent from DE-A-19 15 772 that the graft copolymer is suitable as a flow auxiliary for polyester molding compositions. Nor is there any recognition in DE-A-19 15 772 that the compatibility of the polyester and the graft copolymer in the range now claimed below is so good that there is very substantially no adverse effect on the mechanical properties of the polyester. Rather, the results of DE-A-19 15 772 imply that, as stated in its Example 3, the incompatibility of a mixture made from 50 parts of graft copolymer and 50 parts of polyethylene terephthalate is so high that it delaminates under mechanical stress. A result of this type is more likely to dissuade the skilled worker from studying molding compositions that comprise polyester and graft copolymers of this type for the production of moldings.

German patent application 100 05 641.5, unpublished at the priority date of the present specification, discloses molding compositions which comprise at least 5 parts by weight of a polyamine-polyamide graft copolymer and up to 95 parts by weight of polyester, or a mixture made from polyester and polyamide. These molding compositions are used as adhesion promoters in composites having two or more layers.

There is a need to improve the flowability of polyesters without any substantial adverse change in the mechanical properties of the polyester, and without bleed-out, during processing or from the molding, of the flow promoter added.

SUMMARY OF THE INVENTION

The present invention provides a polyester molding composition with an improved combination of flowability and mechanical properties. The molding composition comprises from 80 to 99.9 parts by weight of thermoplastic polyester and from 0.1 to 20 parts by weight of a polyamine-polyamide graft copolymer described in further detail below, where the total of the parts by weight of the polyester and of the graft copolymer is 100.

DETAILED DESCRIPTION OF PREFERRED EMBODIMENTS

A first aspect of the present invention is based on providing a molding composition which comprises the following components:

I. from 0.1 to less than 5 parts by weight, preferably at least 0.2 parts by weight, and particularly preferably at least 0.3 parts by weight, of a polyamine-polyamide graft copolymer described in further detail below, and II. from more than 95 to 99.9 parts by weight of a thermoplastic polyester, where the total of the parts by weight of I and II is 100.

The invention also provides moldings produced using this molding composition.

A second aspect of the present invention is based on providing an injection molding composition which comprises the following components:

I. from 0.1 to 20 parts by weight, preferably from 0.2 to 10 parts by weight, and particularly preferably from at least 0.3 to less than 5 parts by weight, of a polyamine-polyamide graft copolymer described in further detail below, and II. from 80 to 99.9 parts by weight, preferably from 90 to 99.8 parts by weight, and particularly preferably from more than 95 to 99.7 parts by weight, of a thermoplastic polyester, where the total of the parts by weight of I and II is 100.

The invention also provides moldings produced by injection molding, using this injection molding composition.

A third aspect of the invention is based on providing a molding composition which comprises the following components, A. from 40 to 99.5% by weight of a mixture made from
I. from 0.1 to 20 parts by weight, preferably from 0.2 to 10 parts by weight, and particularly preferably from 0.3 to less than 5 parts by weight, of a polyamine-polyamide graft copolymer described in further detail below, and II. from 80 to 99.9 parts by weight, preferably from 90 to 99.8 parts by weight, and particularly preferably from more than 95 to 99.7 parts by weight, of a thermoplastic polyester, where the total of the parts by weight of I and II is 100, and B. from 0.5 to 60% by weight, preferably from 2 to 55% by weight, and particularly preferably from 4 to 50% by weight, of particulate, laminar and/or fibrous additives selected from fillers, pigments, reinforcing materials, additives which give the molding composition antistatic properties or electrical conductivity, nucleating agents, and particulate flame retardants.

The flow-promoting action of the graft copolymer is capable of counteracting the viscosity-increasing action of component B., and it is therefore possible to prepare particularly highly filled molding compositions.

The invention also provides moldings produced using this molding composition.

Thermoplastic polyesters are prepared by polycondensing diols with dicarboxylic acids or with polyester-forming derivatives of these, such as dimethyl esters. Suitable diols have the formula HO—R—OH, where R is a divalent, branched or unbranched aliphatic and/or cycloaliphatic radical having from 2 to 40 carbon atoms, preferably from 2 to 12 carbon atoms. Suitable dicarboxylic acids have the formula HOOC—R'—COOH, where R' is a divalent aromatic radical having from 6 to 20 carbon atoms, preferably from 6 to 12 carbon atoms.

Examples which may be mentioned for diols are ethylene glycol, trimethylene glycol, tetramethylene glycol, but-2-ene-1,4-diol, hexamethylene glycol, neopentyl glycol, cyclohexanedimethanol, and also the $C_{36}$ diol dimer diol. The diols may be used alone or as a diol mixture.

Examples of aromatic dicarboxylic acids which may be used are terephthalic acid, isophthalic acid, 1,4-, 1,5-, 2,6- and 2,7-naphthalenedicarboxylic acid, diphenic acid and diphenyl ether 4,4'-dicarboxylic acid. Up to 30 mol % of these dicarboxylic acids may have been replaced by aliphatic or cycloaliphatic dicarboxylic acids having from 3 to 50 carbon atoms, preferably having from 6 to 40 carbon atoms, e.g. succinic acid, adipic acid, sebacic acid, dodecanedioic acid or cyclohexane-1,4-dicarboxylic acid.

Examples of suitable polyesters are polyethylene terephthalate, polypropylene terephthalate, polybutylene terephthalate, polyethylene 2,6-naphthalate, polypropylene 2,6-naphthalate and polybutylene 2,6-naphthalate. The preparation of these polyesters is detailed in DE-A 24 07 155; DE-A 24 07 156; and Ullmann's Encyclopedia of Industrial Chemistry, 4th ed., vol. 19, pp. 65 et seq., (Verlag Chemie, Weinheim, 1980).

The polyamine-polyamide graft copolymer is prepared using the following monomers:

a) from 0.5 to 25% by weight, preferably from 1 to 20% by weight, and particularly preferably from 1.5 to 16% by weight, based on the graft copolymer, of a branched polyamine having at least 4 nitrogen atoms, preferably at least 8 nitrogen atoms, and particularly preferably at least 11 nitrogen atoms, and having a number-average molar mass $M_n$ of at least 146 g/mol, preferably of at least 500 g/mol, and particularly preferably of at least 800 g/mol, and b) polyamide-forming monomers selected from lactams, ω-aminocarboxylic acids, and/or from equimolar combinations of diamine and dicarboxylic acid.

In one preferred embodiment, the concentration of amino groups in the polyamine-polyamide copolymer is in the range from 100 to 2500 mmol/kg.

Examples of the classes of substances which may be used as branched polyamine are:
dendrimers, such as
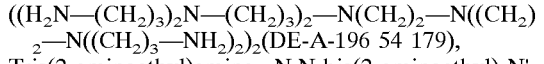
$_2$—N((CH$_2$)$_3$—NH$_2$)$_2$)$_2$(DE-A-196 54 179),
Tris(2-aminoethyl)amine, N,N-bis(2-aminoethyl)-N', N'-bis[2-[bis(2-aminoethyl)amino]ethyl]-1,2-ethanediamine, 3,15-bis(2-aminoethyl)-6,12-bis[2-[bis(2-aminoethyl)amino]ethyl]-9-[2-[bis[2-bis(2-aminoethyl)amino]ethyl]amino]ethyl]-3,6,9,12,15-pentaazaheptadecane-1,17-diamine (J. M. Warakomski, Chem. Mat. 1992, 4, 1000–1004);

branched polyethyleneimines, which are obtainable by polymerizing aziridines (Houben-Weyl, Methoden der Organischen Chemie [Methods of Organic Chemistry], Vol. E20, pp. 1482–1487, Georg Thieme Verlag, Stuttgart, 1987) and which generally have the following distribution of amino groups:
from 25 to 46% of primary amino groups,
from 30 to 45% of secondary amino groups, and
from 16 to 40% of tertiary amino groups.

In the preferred case, the polyamine has a number-average molar mass $M_n$ of not more than 20,000 g/mol, particularly preferably not more than 10,000 g/mol, and with particular preference not more than 5000 g/mol.

The polyamide-forming monomers used may be any of those monomers which are suitable for preparing polyamides, in particular lactams and/or ω-aminocarboxylic acids. Particular preference is given to ε-caprolactam, ω-aminoundecanoic acid and/or laurolactam. However, it is also possible to use an equivalent combination of diamine and dicarboxylic acid, where appropriate together with a lactam and/or with an ω-aminocarboxylic acid. Examples of monomers which may in principle be used are the following:

branched or unbranched aliphatic diamines having from 6 to 14 carbon atoms, e.g. 1,6-hexamethylenediamine, 2-methyl-1,5-diaminopentane, 2,2,4- or 2,4,4-trimethylhexamethylenediamine, 1,9-nonamethylenediamine, 1,10-decamethylenediamine, and 1,12-dodecamethylenediamine;

cycloaliphatic diamines having from 6 to 22 carbon atoms, e.g. 4,4'-diaminodicyclohexylmethane, 3,3'-dimethyl-4,4'-diaminodicyclohexylmethane, 4,4'-diaminodicyclohexylpropane, 1,4-diaminocyclohexane, 1,4-bis(aminomethyl)cyclohexane, 2,6-bis(aminomethyl)norbornane, and 3-aminomethyl-3,5,5-trimethylcyclohexylamine;

araliphatic diamines having from 8 to 22 carbon atoms, e.g. m- and p-xylylenediamine and bis(4-aminophenyl)propane;

branched or unbranched aliphatic dicarboxylic acids having from 6 to 22 carbon atoms, e.g. adipic acid, 2,2,4- and 2,4,4-trimethyladipic acid, azelaic acid, sebacic acid, and 1,12-dodecanedioic acid;

cycloaliphatic dicarboxylic acids having from 6 to 22 carbon atoms, e.g. cyclohexane-1,4-dicarboxylic acid, 4,4'-dicarboxyldicyclohexylmethane, 3,3'-dimethyl-4,4'-dicarboxyldicyclohexymethane, 4,4'-dicarboxyldicyclohexylpropane, and 1,4-bis(carboxymethyl)cyclohexane;

araliphatic dicarboxylic acids having from 8 to 22 carbon atoms, e.g. 4,4'-diphenylmethanedicarboxylic acid;

aromatic dicarboxylic acids having from 8 to 22 carbon atoms, e.g. isophthalic acid, tributylisophthalic acid, terephthalic acid, 1,4-, 1,5-, 2,6- and 2,7-naphthalenedicarboxylic acid, diphenic acid, and diphenyl ether 4,4'-dicarboxylic acid;

lactams having from 6 to 12 carbon atoms, and the corresponding ω-aminocarboxylic acids, e.g. ε-caprolactam, ε-aminocaproic acid, caprylolactam, ω-aminocaprylic acid, ω-aminoundecanoic acid, laurolactam, or ω-aminododecanoic acid.

In one possible embodiment, the graft polymer is prepared with the additional use of an oligocarboxylic acid selected among from 0.015 to about 3 mol % of dicarboxylic acid and from 0.01 to about 1.2 mol % of tricarboxylic acid, based in each case on the entirety of the other polyamide-forming monomers. In this calculation each of the monomers in the equivalent combination of diamine and dicarboxylic acid is treated separately. If a dicarboxylic acid is used it is preferable to add from 0.03 to 2.2 mol %, particularly from 0.05 to 1.5 mol %, very particularly from 0.1 to 1 mol %, and in particular from 0.15 to 0.65 mol %. If a tricarboxylic acid is used, the amount is preferably from 0.02 to 0.9 mol %, particularly preferably from 0.025 to 0.6 mol %, very particularly preferably from 0.03 to 0.4 mol %, and in particular from 0.04 to 0.25 mol %. Concomitant use of the oligocarboxylic acid significantly improves the solvent resistance and hydrolysis resistance of the graft copolymer.

The oligocarboxylic acid used may be any desired di- or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

Use may also be made as regulator, if desired, of aliphatic, alicyclic, aromatic, aralkylic and/or alkylaryl-substituted monocarboxylic acids having from 3 to 50 carbon atoms, for example lauric acid, unsaturated fatty acids, acrylic acid or benzoic acid. Use of the regulators can reduce the concentration of amino groups without altering the form of the molecule. This method can also introduce functional groups, such as double or triple bonds, etc. However, it is desirable for the graft copolymer to have a substantial proportion of amino groups. The concentration of amino groups in the graft copolymer is preferably in the range from 150 to 1500 mmol/kg, particularly preferably in the range from 250 to 1300 mmol/kg, and very particularly preferably in the range from 300 to 1100 mmol/kg. Here, and below, amino groups are not only terminal amino groups but also any secondary or tertiary amine functions which may be present in the polyamine.

The graft copolymers of the invention may be prepared by various processes.

One possibility is for lactam and, respectively, ω-aminocarboxylic acid, and polyamine to be polymerized and, respectively, polycondensed. The oligocarboxylic acid may be added either at the start or during the course of the reaction.

However, a preferred process has two stages in which the lactam cleavage and prepolymerization is first carried out in the presence of water (or as an alternative, the corresponding ω-aminocarboxylic acids and, respectively, diamines and dicarboxylic acids are used directly and prepolymerized). The polyamine is added in the second step, and the oligocarboxylic acid which, where appropriate, is used concomitantly is metered in during or after the prepolymerization. The pressure on the mixture is then reduced at from 200 to 290° C., and polycondensation is carried out in a stream of nitrogen or in vacuo.

Another preferred process is the hydrolytic degradation of a polyamide to give a prepolymer, and simultaneous or subsequent reaction with the polyamine. The polyamides used are preferably those in which the end-group difference is approximately zero or in which the oligocarboxylic acid which may, where appropriate, be used concomitantly has been incorporated by polycondensation. However, it is also possible for the oligocarboxylic acid to be added at the start, or during the course, of the degradation reaction.

These processes can prepare polyamides with an ultrahigh level of branching and with acid values below 40 mmol/kg, preferably below 20 mmol/kg, and particularly preferably below 10 mmol/kg. Approximately complete conversion is achieved after as little as from one to five hours of reaction time at temperatures of from 200 to 290° C.

If desired, another step may be attached to the process: a vacuum phase lasting a number of hours. This lasts for at least four hours, preferably at least six hours, particularly preferably at least eight hours, at from 200 to 290° C. After an induction period of a number of hours, an increase in melt viscosity is then observed and is likely to be attributable to the occurrence of a reaction of terminal amino groups with one another, with elimination of ammonia and chain-linkage.

If there is a desire not to complete the reaction in the melt, it is possible to carry out solid-phase postcondensation of the graft copolymer, as in the prior art applicable to polyamides.

The polyester and the graft copolymer may be mixed with one another with any of the methods of the prior art, preferably in the melt in a kneading assembly.

Besides these two components I and II, the molding composition may also comprise up to a total of 60% by weight of additives, selected from

- impact modifiers usual for polyesters, for example ethylene-α-olefin copolymers (in particular EPM and EPDM) or styrene/ethylene-butylene block copolymers (in particular SEBS), where in all of these cases the impact modifier also bears functional groups, e.g. anhydride, and also α-olefin-acrylate terpolymers with an olefinically unsaturated anhydride, glycidyl acrylate or glycidyl methacrylate as third component;
- other polymers, such as polycarbonate, (meth)acrylate homo- and copolymers, styrene-acrylonitrile copolymers, acrylonitrile-butadiene-styrene copolymers (ABS);
- fillers and pigments, such as carbon black, titanium dioxide, glass beads, hollow glass beads, talc, zinc sulfide, silicates or carbonates;
- reinforcing materials, such as glass fibers, aramid fibers, or whiskers;
- additives which give the molding composition antistatic properties or electrical conductivity, e.g. carbon fibers, graphite fibrils, stainless steel fibers, or conductivity black;
- particulate flame retardants, such as magnesium hydroxide, aluminum hydroxide, or melamine cyanurate;
- conventional auxiliaries and additives, e.g. plasticizers, waxes, nucleating agents, other flame retardants, antioxidants, UV stabilizers, or hydrolysis stabilizers.

The molding compositions of the invention serve for production of moldings of any type, in particular for the electrical engineering sector and the electronics industry. The first and the third aspects of the invention can produce moldings by any of the methods of the prior arts, such as extrusion, blow molding, thermoforming and injection molding [including GIT (gas injection method) and WIT (water injection method)], while the second aspect of the invention generally produces moldings by injection molding the molding composition (including GIT and WIT). In all of these cases, the moldings may be a composite having two or more layers and comprising one or more layers made from the molding composition of the invention, or may be composed entirely of the molding composition of the invention. In composites having two or more layers, the other constituent(s) of the composite may be other thermoplastic molding compositions, as is the case, for example, in fuel lines for automobiles, or the material may be a vulcanized rubber compound. Composites of this type with known polyester molding compositions are prior art.

The molding composition of the invention is particularly advantageously used for moldings of small dimensions, in particular injection moldings, such as those for plug connectors in the electronics industry.

The invention will be illustrated below by way of examples.

COMPARATIVE EXAMPLE 1 (CONTROL)

A molding composition of the following makeup is prepared by mixing in the melt in a twin-screw extruder:

100 parts by weight of VESTODUR® 1000, a DEGUSSA-HÜLS AG polybutylene terephthalate,
17.5 parts by weight of a bromine-containing flame retardant,
10 parts by weight of antimony oxide as synergist,

EXAMPLES 1 TO 3

A molding composition was prepared as in Comparison Example 1 with just one difference: the amount given in Table 1 of the polyamine-polyamide graft copolymer was also added. The results are given in Table 1.

COMPARATIVE EXAMPLE 2

A molding composition was prepared as in Comparative Example 1 with just one difference: 1.0 part by weight of Ceasit PC (calcium stearate) was added as flow promoter for each 100 parts by weight of the molding composition. The results are given in Table 1.

TABLE 1

| | Results | | | | |
|---|---|---|---|---|---|
| Addition to 100 parts by weight of molding composition | Comparative Example1 — | Example 1 0.5 part by weight of graft copolymer | Example 2 1.0 part by weight of graft copolymer | Example 3 2.0 part by weight of graft copolymer | Comparative Example 2 1.0 part by weight of calcium stearate |
| Tests: | | | | | |
| Notch impact strength (CHARPY) 23° C. | 11.0 | 10.4 | 10.9 | 11.3 | 10.6 |
| ISO 179/1eA −30° C. [kJ/m$^2$] | 11.0 | 12.1 | 13.6 | 12.8 | 12.2 |
| Tensile test ISO 527: | | | | | |
| Ultimate tensile strength [N/mm$^2$] | 132 | 138 | 139 | 128 | 131 |
| Elongation at break [%] | 1.3 | 1.4 | 1.4 | 1.2 | 1.2 |
| Modulus of elasticity [N/mm$^2$] | 14,600 | 14,300 | 14,900 | 15,400 | 14,800 |
| Flow spiral 2 mm height, 20 mm width[a] [Length in mm] | 325 | 400 | 445 | 520 | 370 |
| Fire performance 1.6 mm | V-0 | V-0 | V-0 | V-0 | V-0 |
| UL 94 0.8 mm | V-0 | V-0 | V-0 | V-0 | V-0 |

[a] Melt temperature 260° C., mold temperature 80° C., injection pressure 1420 bar, injection time 5 s, hold-pressure time 10 s, cycle time 36 s 105 parts by weight of glass fiber,
1 part by weight of conventional stabilizers, and
0.5 part by weight of a conventional mold-release agent.

The mechanical and rheological properties of the molding composition were determined, and the results are given in Table 1.

Preparation of a Polyamine-polyamide Graft Copolymer 4.78 kg of laurolactam were melted in a heating vessel at from 180 to 210° C. and transferred into a pressure-tight polycondensation vessel. 250 ml of water and 57 ppm of hypophosphorous acid were then added. The laurolactam cleavage was carried out at 280° C. under autogenic pressure. The pressure was then reduced within a period of 3 h to give a residual water-vapor pressure of 3 bar, and 230 g of polyethyleneimine (LUPASOL® g 100, BASF AG, Ludwigshafen) were added. The pressure was then reduced to give atmospheric pressure, and the polycondensation was carried out under a stream of nitrogen, for 2 h at 250° C. The clear melt was discharged as extrudate, via a melt pump, cooled in a water bath and then pelletized.

The resulting graft copolymer had a polyethyleneimine fraction of 4.5% by weight and a nylon-12 fraction of 95.5% by weight.

It can be seen from Table 1 that, even with small additions of a polyamine-polyamide graft copolymer, the molding composition of the invention has markedly better flowability than on addition of a comparable amount of a conventional flow promoter, while the mechanical properties of the molding composition are very substantially retained.

The disclosure of the priority document, Patent Application No. 10064335.3, filed in Germany on Dec. 21, 2000, is incorporated by reference herein in its entirety.

What is claimed is:

1. A molding composition, comprising:
   I. from 0.1 to less than 5 parts by weight of a polyamine-polyamide graft copolymer which is prepared using the following monomers:
      a) from 0.5 to 25% by weight, based on the graft copolymer, of a branched polyamine having at least 4 nitrogen atoms and a number-average molar mass Mn of at least 146 g/mol, and
      b) polyamide-forming monomers selected from the group consisting of lactams, ω-aminocarboxylic acids, and equimolar combinations of diamine and dicarboxylic acid; and II. from more than 95 to 99.9 parts by weight of a thermoplastic polyester, where the total of the parts by weight of I and II is 100;

wherein said branched polyamine is selected from the group consisting of branched polyethyleneimines having the following distribution of amino groups; from 25 to 46% of primary amino groups, from 30 to 45% of secondary amino groups, and from 16 to 40% of tertiary amino groups.

2. The molding composition as claimed in claim 1, wherein the thermoplastic polyester has been selected from the group consisting of polyethylene terephthalate, polypropylene terephthalate, polybutylene terephthalate, polyethylene 2,6-naphthalate, polypropylene 2,6-naphthalate and polybutylene 2,6-naphthalate.

3. The molding composition as claimed in claim 1, wherein the polyamine-polyamide graft copolymer is prepared using from 1 to 20% by weight of the polyamine.

4. The molding composition as claimed in claim 1, wherein the polyamine-polyamide graft copolymer is prepared using from 1.5 to 16% by weight of the polyamine.

5. The molding composition as claimed in claim 1, wherein the polyamine contains at least 8 nitrogen atoms.

6. The molding composition as claimed in claim 1, wherein the polyamine contains at least 11 nitrogen atoms.

7. The molding composition as claimed in claim 1, wherein the polyamine has a number-average molar mass Mn of at least 500 g/mol.

8. The molding composition as claimed in claim 1, wherein the polyamine has a number-average molar mass Mn of at least 800 g/mol.

9. The molding composition as claimed in claim 1, wherein the concentration of amino groups in the graft copolymer is in the range from 100 to 2500 mmol/kg.

10. The molding composition as claimed in claim 1, wherein the molding composition comprises, besides components I and II, up to a total of 60% by weight of additives.

11. A molding produced using the molding composition of claim 1.

12. A molding that is a composite having two or more layers and comprising one or more layers made from the molding composition of claim 1.

13. A molding consisting of the molding composition of claim 1.

14. A method of making a molding composition as claimed in claim 1, the method comprising adding said polyamine-polyamide graft copolymer to a said polyester, to obtain the molding composition of claim 1.

15. An injection molding composition, consisting essentially of:
I. from 0.1 to 20 parts by weight of a polyamine-polyamide graft copolymer which is prepared using the following monomers:
a) from 0.5 to 25% by weight, based on the graft copolymer, of a branched polyamine having at least 4 nitrogen atoms and a number-average molar mass Mn of at least 146 g/mol, and
b) polyamide-forming monomers selected from the group consisting of lactams, ω-aminocarboxylic acids, and equimolar combinations of diamine and dicarboxylic acid; and
II. from 80 to 99.9 parts by weight of a thermoplastic polyester, where the total of the parts by weight of I and II is 100;
wherein said branched polyamine is selected from the group consisting of branched polyethyleneimines having the following distribution of amino groups; from 25 to 46% of primary amino groups, from 30 to 45% of secondary amino groups, and from 16 to 40% of tertiary amino groups.

16. The injection molding composition as claimed in claim 15, wherein the thermoplastic polyester has been selected from the group consisting of polyethylene terephthalate, polypropylene terephthalate, polybutylene terephthalate, polyethylene 2,6-naphthalate, polypropylene 2,6-naphthalate and polybutylene 2,6-naphthalate.

17. The injection molding composition as claimed in claim 15, wherein the polyamine-polyamide graft copolymer is prepared using from 1 to 20% by weight of the polyamine.

18. The injection molding composition as claimed in claim 15, wherein the polyamine-polyamide graft copolymer is prepared using from 1.5 to 16% by weight of the polyamine.

19. The injection molding composition as claimed in claim 15, wherein the polyamine contains at least 8 nitrogen atoms.

20. The injection molding composition as claimed in claim 15, wherein the polyamine contains at least 11 nitrogen atoms.

21. The injection molding composition as claimed in claim 15, wherein the polyamine has a number-average molar mass Mn of at least 500 g/mol.

22. The injection molding composition as claimed in claim 15, wherein the polyamine has a number-average molar mass Mn of at least 800 g/mol.

23. The injection molding composition as claimed in claim 15, wherein the concentration of amino groups in the graft copolymer is in the range from 100 to 2500 mmol/kg.

24. The injection molding composition as claimed in claim 15, wherein the injection molding composition comprises, besides components I and II, up to a total of 60% by weight of additives.

25. A molding produced using the molding composition of claim 15.

26. A molding that is a composite having two or more layers and comprising one or more layers made from the molding composition of claim 15.

27. A molding consisting of the injection molding composition of claim 15.

28. A method of making an injection molding composition as claimed in claim 15, the method comprising adding said polyamine-polyamide graft copolymer to said polyester, to obtain the molding composition of claim 15.

29. A molding composition, consisting essentially of:
A. from 40 to 99.5% by weight of a mixture made from
I. from 0.1 to 20 parts by weight of a polyamine-polyamide graft copolymer which is prepared using the following monomers:
a) from 0.5 to 25% by weight, based on the graft copolymer, of a branched polyamine having at least 4 nitrogen atoms and a number-average molar mass Mn of at least 146 g/mol, and
b) polyamide-forming monomers selected from the group consisting of lactams, ω-aminocarboxylic acids, and equimolar combinations of diamine and dicarboxylic acid, and
II. from 80 to 99.9 parts by weight of a thermoplastic polyester, where the total of the parts by weight of I and II is 100; and
B. from 0.5 to 60% by weight of at least one particulate, laminar or fibrous additive selected from the group consisting of fillers, pigments, reinforcing materials, additives which give the molding composition antistatic properties or electrical conductivity, nucleating agents, and particulate flame retardants;

wherein an amount of each of A and B is based on the total sum of A and B;

wherein said branched polyamine is selected from the group consisting of branched polyethyleneimines having the following distribution of amino groups; from 25 to 46% of primary amino groups, from 30 to 45% of secondary amino groups, and from 16 to 40% of tertiary amino groups.

30. The molding composition as claimed in claim 29, wherein the thermoplastic polyester has been selected from the group consisting of polyethylene terephthalate, polypropylene terephthalate, polybutylene terephthalate, polyethylene 2,6-naphthalate, polypropylene 2,6-naphthalate and polybutylene 2,6-naphthalate.

31. The molding composition as claimed in claim 29, wherein the polyamine-polyamide graft copolymer is prepared using from 1 to 20% by weight of the polyamine.

32. The molding composition as claimed in claim 29, wherein the polyamine-polyamide graft copolymer is prepared using from 1.5 to 16% by weight of the polyamine.

33. The molding composition as claimed in claim 29, wherein the polyamine contains at least 8 nitrogen atoms.

34. The molding composition as claimed in claim 29, wherein the polyamine contains at least 11 nitrogen atoms.

35. The molding composition as claimed in claim 29, wherein the polyamine has a number-average molar mass Mn of at least 500 g/mol.

36. The molding composition as claimed in claim 29, wherein the polyamine has a number-average molar mass Mn of at least 800 g/mol.

37. The molding composition as claimed in claim 29, wherein the concentration of amino groups in the graft copolymer is in the range from 100 to 2500 mmol/kg.

38. The molding composition as claimed in claim 29, wherein the molding composition comprises, besides components I and II, up to a total of 60% by weight of additives other than component B.

39. A molding produced using the molding composition of claim 29.

40. A molding that is a composite having two or more layers and comprising one or more layers made from the injection molding composition of claim 29.

41. A molding consisting of the molding composition of claim 29.

42. A method of making a molding composition as claimed in claim 29, the method comprising adding a said polyamine-polyamide graft copolymer to a said polyester, to obtain the molding composition of claim 29.

* * * * *